United States Patent [19]

Doyle

[11] Patent Number: 4,920,657
[45] Date of Patent: May 1, 1990

[54] ASSEMBLY FOR PLUMB BOB AND LINE

[76] Inventor: Richard A. Doyle, 54 E. Kidder St., Portland, Me. 04103

[21] Appl. No.: 113,146

[22] Filed: Oct. 23, 1987

[51] Int. Cl.$^5$ ............................................. G01C 15/10
[52] U.S. Cl. ...................................... 33/393; 33/394; 242/68.5
[58] Field of Search ................ 33/393, 394, 392, 413, 33/414; 242/84.21 W, 157.1, 68.5, 84.8

[56] References Cited

U.S. PATENT DOCUMENTS

| | | | |
|---|---|---|---|
| 266,671 | 10/1882 | Bergen | 33/393 |
| 1,571,687 | 2/1926 | O'Loughlin | 33/394 |
| 2,637,913 | 5/1953 | Williams | 33/393 |
| 2,922,599 | 1/1960 | Bigelow | 242/157.1 |
| 3,016,616 | 1/1962 | Matson | 33/393 |
| 4,697,349 | 10/1987 | Lee | 33/393 |

FOREIGN PATENT DOCUMENTS 359293 2/1962 Switzerland ........................ 33/394
687941 2/1953 United Kingdom ........ 242/84.21 W Primary Examiner—William A. Cuchlinski, Jr.
Assistant Examiner—Patrick R. Scanlon
Attorney, Agent, or Firm—Pearson & Pearson

[57] ABSTRACT

The assembly includes the plumb bob and line, and a cylindrical rotor mounted eccentrically for eccentric rotation about an axis of rotation. The line is connected at one end to the rotor and at the other end to the plumb bob. The rotor may be rotated to pay out and retract or wind in the line. The plumb bob may be stored within the casing. Side walls of the casing perpendicular to the axis of rotation closely confine the space beyond the rotor ends to confine the line as it is winding in.

Other features include a conical sheath to receive the point of the plumb bob and arms to hold the cylindrical body of the bob; also a detent cooperating with the casing and the folded handle may be used to hold the handle and the rotor fixed.

10 Claims, 1 Drawing Sheet

ASSEMBLY FOR PLUMB BOB AND LINE

FIELD OF THE INVENTION

The present invention relates to assemblies for a plumb bob and line.

BACKGROUND OF THE INVENTION

The following U.S. patents are illustrative of the art in the field of the invention.

Wilbur, 932,218, Aug. 24, 1909 for Reel. The line for a plumb bob is wound on a reel spool 18. A brake shoe is normally pressed against the periphery or head 20 of the spool by action of a spring 23. To release the brake shoe, a trigger like button 17 is pressed to compress the spring 23 further and release the brake shoe 18 from engagement with the head 20 permitting the line to be payed out or wound in.

Burns, 1,043,293, Nov. 5, 1912, for Plumb Bob. The bob line is wound upon a reel 7. A brake-ring 15 is actuated by a spring 20 to brake the reel 7. When payout is desired, a button 21 is pressed to compress the spring and release the reel.

O'Loughlin, 1,571,667, Feb. 2, 1926, for Plumb Bob Carrier. A plumb carrier winds the cord of the plumb upon a reel mounted on a shaft 24 journaled in bearings. A spiral spring 25 within the reel causes winding of the cord when dogs 27 are in disengagement with cams 26, and when engaged halt the reel, as in window shade operation.

Spaeth et al., 1,876,473, Sept. 6, 1932, for Plumb Bob and Chalk Line. A plumb bob contains a reel on which, by means of an external handle, the line is wound inside the bob to a desired length.

Hoagland, 2,384,917, Sept. 18, 1945, for Plumb Bob Line Reel. The reel container may be fastened to a wall. A set screw 20 may be applied against a flange 2a of the reel 2 in order to hold the line from payout.

Worden, 2,492,609, Dec. 27, 1949, for Brake for Plumb Bob Reels. A plumb bob 15 is reeled upon a reel 13. The handle 20 of the reel may fold inwardly for insertion in the open end of hub 10 of the reel to expand fingers 12 into tight fitting frictional engagement with the hub.

Landon et al., 2,589,500, March 18, 1952, for Combined Chalk Line Box and Plumb Bob. A crank 27 with a handle 48 reels in or pays out the line for a combined plumb bob and case. The crank handle 49 locks in an opening in the case when the device is not in use.

Williams, 2,637,913, May 12, 1953, for Plumb Bob Carrier. A slidable latch 41 engages the reduced neck 44 of a plumb bob in storage so that the bob is secured against or in a container for the line. The latch may be slid to release the neck and free the bob, allowing the line to be paid out.

Unger, 3,011,263, Dec. 5, 1962, for Plumb Bob Device. A reel or spool 3 is mounted rotatably in a case 5 on a shaft 10. An operating crank 11 actuates the spool. Wells or sockets 12 in the case receive the handle 25 of crank 11 for securing the reel or spool against rotation. There is no provision for distributing the line on the reel.

Matson, 3,016,606, Jan. 16, 1962, for Combination Marking Line and Plumb Bob. A marking line 16 has one end fixed to the hub of a reel 3 enclosed in a container having a dye well for marking dye to be applied to the plumb line.

Bosco, 4,459,761, July 17, 1984 for Retractable Plumb and Chalk Line. A crank arm at one end rotates a shaft 20 on which is wound the line of a plumb bob 12. A bell crank member 33 when retracted causes dog-engagement of lugs with the case to prevent unwinding of the line.

SUMMARY OF THE INVENTION

According to the invention the assembly comprises a casing, a rotor mounted in the casing, a plumb bob, a line having two ends, one of which is connected to the rotor and the other of which is connected to the bob; and means for rotating the rotor about the axis of rotation in two directions respectively to wind in the line and to pay out the line. The rotor has a body with an external surface of rotation about a second axis interrupted at the respective axial ends by plane surfaces normal to the axis of rotation. Thus the rotor is mounted for eccentric rotation. The assembly comprises means for rotating the rotor about its axis of rotation in one direction to wind in the line and distribute it along the rotor surface axially, and in the other direction to pay out the line. The casing has side walls substantially in the axial plane to restrict the axial distribution of the line to within the side walls.

Other features involve a means between the rotor and the line over which the line passes to smooth its passage to and from the rotor; and means for conveniently receiving and storing the plumb bob in the casing.

DESCRIPTION OF THE DRAWINGS

The various objects, advantages, and novel features of the invention will be more readily understood from the following detailed description, in which like reference characters refer to line parts, and in which.

DETAILED DESCRIPTION OF THE PREFERRED EMBODIMENTS

Figure 1:
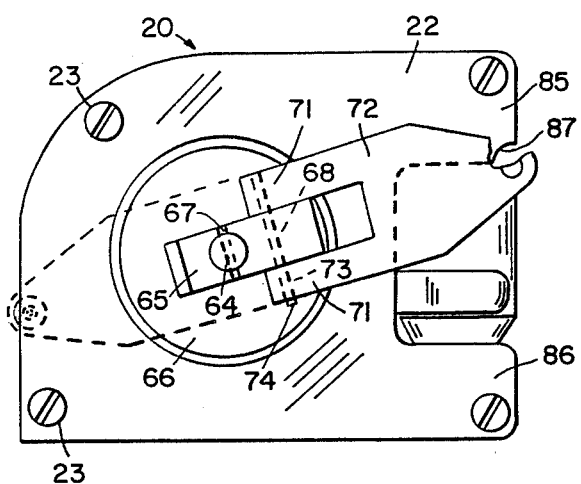
FIG. 1 is a side view of an embodiment of the invention with the plumb bob stored in the casing.

Embodiment of FIGS. 1-6.

A casing 20 comprises a body or shell 21 and a cover 22 fastened to the shell by screws 23 entered in screw holes 24 in three corner elements 26 and a fourth element, a foot 27. The corner elements 26 applied to the inner corners and the bottom respectively of the shell are fastened by soldering or the like. A foot 27 extends to the right hand corner, as viewed in FIG. 3, and the front of the shell 21. At the rear of the foot 27 extending upward nearly to the top of and across the entire width of the shell 21 is erected a vertical leg 28 which terminates at the top with a rounded knee 29. In the foot 27 is a conical sheath 30 facing upwards and having the same conical angle as the point of the plumb bob, to be described hereinafter.

Figure 5:
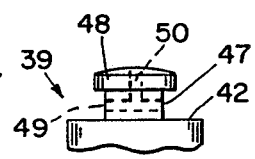
FIG. 5 is a face view of a portion of the plumb bob of FIG. 2.
Figure 6:
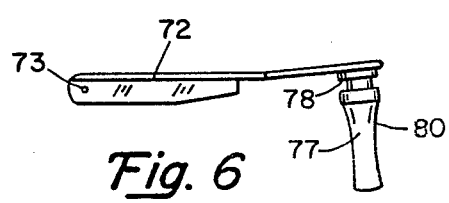
FIG. 6 is a side view of a handle of the embodiment of FIG. 1.

The casing also comprises a base 31, a top 32, a back 33, and a right side wall 34, the cover 22 serving also as the left side wall. Affixed to the front face 35 of the leg 28 is a clasping element 36 which has a pair of forward extending grasping arms 37 forward of the leg 28 with inwardly facing vertical clasping surfaces 43 and 44 which are designed to lightly grasp the cylindrical body 38 of a plumb bob 39. The element 36 also has a pair of forwardly extending horizontal faced clasping elements 41 which are intended to grasp the upper surface 42 of the plumb bob as best seen in FIG. 5 when it is stored in place vertically. Depending from the cylindrical body 38 in the erect position of the plumb bob 39 is a conical part 45 terminating in a point 46. Upward from the top of the cylindrical body 38 is a neck 47 and on the neck a head 48. The neck 47 is horizontally drilled with a small through hole 49. The head 48 is drilled with a vertical hole 50 which communicates with the horizontal hole 49.

The parts thus far described with the exception of the cover 22 and the screws applying it to the casing, and with the exception also of the plumb bob 39 may be assembled in place and suitably brazed or soldered. The clasping element 36 may be made of spring steel or the like, and the remaining parts of brass or other durable and sturdy materials. The various parts within the casing except for the clasping element extend from the cover 22 when in place, acting as the left side wall, to the right side wall 34.

Figure 4:
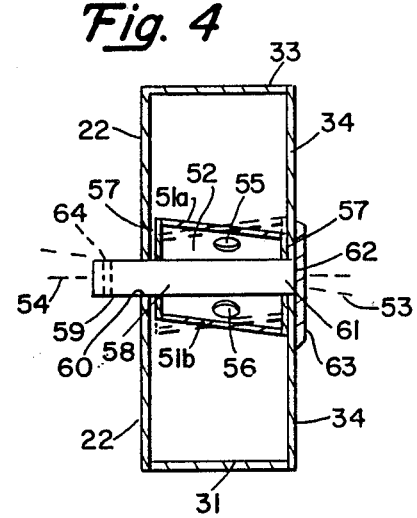
FIG. 4 is a partial sectional view along the lines 4—4 of FIG. 2.

The assembly also comprises a hollow cylindrical rotor 52 having an axis 53 mounted for eccentric rotation about an axis 54. As best seen in FIG. 4 the rotor has opposite surfaces 51a and 51b which are parallel to each other but not parallel to the axis of rotation 54. The cylindrical rotor 52 is pierced with first and second openings 55 and 56 about 90 degrees apart from the cylindrical axis 53. The hollow cylindrical rotor is completed with end walls 57 and an axle centered along the axis of rotation, walls and axle both brazed to the rotor 52 for rigidity. The end walls 57 are at right angles to the axis of rotation 54. The rotor 52 therefore is a body mounted for rotation about a first axis 54 and having an external surface of rotation about a second axis 53 interrupted at the respective axial ends by plan surfaces normal to the axis of rotation. The two axes 53, 54 meet at an acute angle. Stated differently, the rotor 52 constitutes an oblique volume, in this particular embodiment an oblique cylinder (as opposed to a right cylinder) on the rotor 58. In this particular embodiment the end wall 57 is centered on the rotor 58 while the other end wall intercepts the rotor 58 off center of the other end wall 57.

The rotor or rotor body 52 is mounted for rotation about the axis 54 by having its axle 58 journaled at one end 59 through a hole opening 60 in the cover 22 and at the other end 61 of the axle 58 through an opening 62 in the right side wall 34. The right side wall opening 62 is closed by a cover plate 63, so that the other axle end 61 enters the hole or opening 62 but cannot extend beyond it, so that the axle is journaled in the hole 62.

A hole 64 is drilled near the end of the axle. A bar 65 is brazed to a shield 66, and drilled to receive a pin 67 which extends into the hole 64, with the pin axis centered axially but transversely of the axis 54. Rotation of the bar 65 and shield 66 thus cause rotation of the rotor 52 by torque against the pin 67, which is affixed by peening or the like to remain in place. The shield prevents undesired shifting of the pin-connected bar 65 because the shield cannot shift laterally without meeting the cover plate.

The bar is also drilled at a space axially removed from the rotation axis 54 with a drill hole 68. The bifurcations or legs 71 of a rigid handle 72 are drilled through at 73 and permanently pinned in alignment with the drill hole 68, the pin 74 allowing for folding rotation of the handle 72. At the other end of the handle 72 from the legs 71 is a handle portion 77 extending at right angles to the remote axis of drill hole 73 and in the unfolded condition of the handle 72 extends inward of the casing. When folded, the handle 72 folds against the shield 66, as indicated by the dotted lines in FIG. 1, and in this position also the legs grasp between them the bar 65.

The handle 72 comprises a narrowed neck 78 and a fuller handle extension 80 convenient to finger manipulation extending at right angles to the axis of the pin 73. A line 82 may be fastened at one end to the rotor by tying it through the rotor holes 55. For affixing the other end of the line to the bob 39, the line is entered into the vertical hole 50, threaded through into one side of the communicating horizontal hole 49, and the end knotted or otherwise enlarged, whereupon tension on the line 82 will cause the enlarged portion to lodge within the horizontal opening or hole 49 unable to pass the intersection of the two holes 49, 50 assuming appropriate sizing of these holes and the diameter of the line.

As may be observed in FIG. 1, the cover is substantially rectangular, with a rounded corner at the upper left as viewed in that figure, and with an upper arm 85 and a lower arm 86, both extnding to the right. The upper arm, at its right hand lowermost corner has a small concave portion 87 removed or rounded off, that is complementary in form to receive the narrowed neck 78 of the handle as a detent.

In the description the terms up, down, front, back and the like are used only for descriptive purposes. The structure is not necessarily oriented in any particular way.

OPERATION

Embodiment of FIGS. 1-6

In operation, the line 82 is readily fastened to the rotor 52 as described above by passing the line through the two apertures 55 and 56 and the hollow rotor. After the line is fastened the cover may be put in place, and the other end of the line 82 fastened to the plumb bob 39 as described by inserting the other end into the vertical hole 50 and then into the horizontal hole 49 and knotted to prevent withdrawal. In fastening the cover the line is placed over the rounded knee 29 and so the unwound portion of the line is available externally of the casing 20.

Now the line 82 may be wound onto the rotor 52. As it is wound onto the rotor, the eccentricity of the rotor causes the line 82 to be distributed axially and smoothly along the rotor. When the winding of the line 82 brings the fastened plumb bob 39 near the casing, the point 46 of the plumb bob may be entered into the conical sheath 30 designed to receive it in the foot 27. The upper part of the bob 39 is then turned against the sheathed part to swing the cylindrical body 38 into the clasp of the arms 37. At the same time the arms 41 by spring action tend to hold the plumb bob 39 downward in its sheath 30.

As the line is wound onto the rotor, the side walls of the casing 20 (including the cover 22 and the right side wall 34) extend perpendicularly to the axis of rotation 54 sufficiently to contain the line 82, and prevent its spreading as the line is distributed by the eccentric rotation of the rotor 22.

If the bob 39 is to be stored, the handle 72 may now be unfolded and extended in the opposite direction to clasp the other side of the bar 65. The neck 78 is engaged in the concave portion 87 which, by slight spring action, acts as a detent and prevents accidental withdrawal of the handle extension 80 and the handle portion 77. Before final entry of the handle neck 78 into this concavity 87, the line 82 may be further drawn snugly upon the rotor 52. If the line is already withdrawn to some degree, it may be locked against further withdrawal by similarly inserting the handle neck 78 into the concavity 87, which is then held there in detent fashion.

When it is desired to place the bob 39 in use, the handle 72 may be withdrawn from the detent hold of the concavity 87 and turned to its other position. Then the body 38 and head 48 of the bob 39 may be tipped forward by withdrawing a short distance of line 82. Then the point or apex 46 of the bob 39 may be withdrawn from its sheath 30 and the line payed out as desired. If one wishes the length of the line out may be stabilized by again engaging the handle in the detent action of the concavity 87.

In this fashion the line may be wound into a desired distance and restored by re-winding, and the length of line with drawn may be stabilized by engaging the detent action of the concavity 87, or the line locked in withdrawn condition withthe bob neatly stored within the arms 37 and held against the sheath 30 by arms 41. Then the plumb 39 may be withdrawn as described above and the line payed out again to a desired length for use of the plumb bob 39.

DETAILED DESCRIPTION

Figure 7:
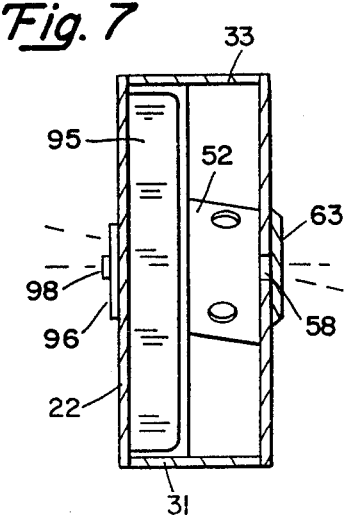
FIG. 7 is a side view of another embodiment of the invention.

Embodiment of FIG. 7.

Figure 2:
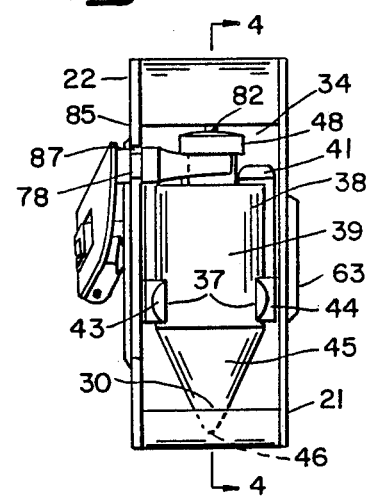
FIG. 2 is a front view of the embodiment of FIG. 1.
Figure 3:
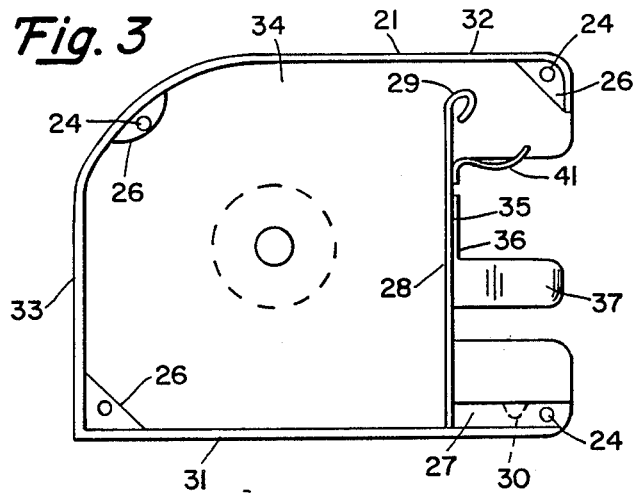
FIG. 3 is a side view of the embodiment of FIG. 1 with a cover of the casing removed and with the plumb bob and line absent.

The embodiment of FIG. 7 is similar to the embodiment of FIGS. 1-6 except for the portion to the left, as viewed in FIG. 2, of the cover 22, and of a winding mechanism or means within the casing 20 to pay out and wind in the line 82 different from that described in connection with FIGS. 1-6. The axle 58 of the rotor is connected to the winding and unwinding means 95, which may be in the form of a mechanism such as one of the known devices for extending a tape line or the like, which may then be automatically retracted by pressing a button, such as the button 98. The axle 58 may have its other end 61 (not shown) journaled in a hole (not shown specifically) in FIG. 7 covered with a second cover plate 96. The means 95 may be simply a wind-up mechanism such as is found in measuring tapes or the like.

OPERATION

Embodiment of FIG. 7.

In operation of the embodiment of FIG. 7, the line is first wound on the rotor. The line is then payed out to wind up the spring in the mechanism 95. The mechanism includes detents or the like, which catch at intervals, and so hold the rotor when stopped. Hence the line may be payed out, and wound in by the rotor on pressing the button 98, and the plumb bob stored in the same way in this embodiment as in that of FIG. 1-6.

CONCLUSION

The assembly or tool described combines a plumb bob, a plumb line, and a reel stored in one unit. Each embodiment winds and coils the line with the attached bob up and into itself and the feature of the eccentric cam rotor causes the plumb line to be evenly distributed on the drum and in the case. The assembly saves time and money through easier handling to obtain a certain plumb line, plumb point, and the lines and points of measures or line and points to measure to and from. It is easy to carry in one piece with no loosely hanging plumb line and bob. The assembly in its carrying case may slip on to a belt or fit in a pocket. Its efficient storage eliminates damage of the plumb line and plumb bob from sharp tools, objects and hot slag, solder, dirt, or debris. Also there is no tangling of the plumb bob in the tool box, gang box, or tool tray by being contained in one unit. The second embodiment has the virtue of ease in one unit. The second embodiment has the virtue of ease of withdrawal and rewinding of the line, which may be rewound by pressing the single button 98. On the other hand the first embodiment is simpler and more easily rewound with different line, and has no spring subject to breakage.

The feature of the eccentrically mounted rotor is not found in other plumb bob carriers. This feature tends to cause the line to be evenly distributed on being wound in, and tends to prevent the line from tangling within the assembly.

I claim:

1. An assembly for a plumb bob and line comprising: a casing;
   a rotor mounted in the casing for rotation about a first axis normal to the casing, the rotor having a body formed therewith that is concentric with a second axis that intersects the first axis at an acute angle centrally of the rotor, the body terminating at each end in a plane normal to the first axis;
   a plumb bob;
   a line having two ends one of which is connected to the rotor body and the other end of which is connected to the plumb bob; and
   means for rotating the rotor about the first axis in two directions, respectively, to wind in and distribute the line axially along the axis of rotation and to pay out the line, the casing having side walls respectively substantially normal to the first axis closely beyond the rotor ends to restrict the axial distribution of the line to within the side walls.

2. An assembly as claimed in claim 1, further comprising a second means between the rotor and bob over which the line may pass in operation.

3. An assembly as claimed in claim 2, the said second means comprising a rounded knee over a leg within the casing over which the line may pass.

4. An assembly as claimed in claim 1, further comprising means within the casing for receiving and storing the bob.

5. An assembly as claimed in claim 4, the said bob having at one end a conically shaped pointed end, the said casing having a base, the means for receiving and storing the bob comprising a conical sheath within the base complementary to the conical pointed end for receiving and storing the end.

6. An assembly as claimed in claim 5, the said bob having a circularly cylindrical body, the said means for receiving and storing comprising a pair of spring arms to receive embrace, and grasp the said body of the bob.

7. An assembly as claimed in claim 5, the said bob having a second end, and at the second end, a shoulder a neck above the shoulder and a head above the neck, the said means for receiving and storing the bob comprising a further pair of spring arms for grasping the cylindrical bob body at its shoulder.

8. An assembly as claimed in claim 7, said rotor comprising an axle mounted for rotation about the first axis and said rotating means comprising a folding handle means connected to the axle and detent means on the casing for engaging the folding handle means when folded thereby to position the folding handle means and the rotor.

9. An assembly for a plumb bob and line comprising:
a casing;
a rotor mounted in the casing for rotation about a first axis normal to the casing, the rotor having a body formed therewith that is concentric with a second axis that intersects the first axis at an acute angle centrally of the rotor, the body terminating at each end in a plane normal to the first axis;
a plumb bob;
a line having two ends one of which is connected to the rotor body and the other end of which is connected to the plumb bob; and
means for rotating the rotor about the first axis including winding mechanism means that is wound when line is pulled from the rotor, and means for releasing said winding mechanism for enabling said winding mechanism to wind the line onto the rotor.

10. An assembly for a plumb bob and line comprising:
a casing;
a rotor for rotation about a first axis mounted in the casing, the rotor including an oblique cylindrical body formed therewith along a second axis that intersects the first axis, the body having axial ends substantially transverse to the first axis;
a line having two ends one of which ends is connected to the rotor body;
means for rotating the rotor in either direction for winding in and paying out the line respectively around and from the rotor;
a plumb bob connected to the other end of the line;
means within the casing for receiving and storing the plumb bob; and
means mounted in the casing between the rotor and the other end of the line for smoothing the winding in and paying out of the line to and from the rotor surface; the casing having side walls perpendicular to the first axis closely confining the space radially of the first axis beyond the rotor surface to confine the line to that space as the line is winding in.

* * * * *